United States Patent [19]

Smith

[11] Patent Number: 5,562,067
[45] Date of Patent: Oct. 8, 1996

[54] EGG HARVESTER

[75] Inventor: Colin J. Smith, Beerwah, Australia

[73] Assignee: Christine Anne Smith, Queensland, Australia; a part interest

[21] Appl. No.: 142,319
[22] PCT Filed: May 25, 1992
[86] PCT No.: PCT/AU92/00233
§ 371 Date: Jun. 21, 1994
§ 102(e) Date: Jun. 21, 1994
[87] PCT Pub. No.: WO92/20222
PCT Pub. Date: Nov. 26, 1992

[30] Foreign Application Priority Data

May 23, 1991 [AU] Australia .................. PK6287
Oct. 14, 1991 [AU] Australia .................. PK8900

[51] Int. Cl.⁶ .................................................. A01K 31/16
[52] U.S. Cl. ................... 119/334; 119/338; 119/440; 119/337
[58] Field of Search ................... 119/45.1, 45.2, 119/45.3

[56] References Cited

U.S. PATENT DOCUMENTS

| | | | |
|---|---|---|---|
| 3,124,102 | 3/1964 | Kurtz et al. | 119/45.3 |
| 3,167,052 | 1/1965 | Kuhlmann | 119/45.3 |
| 3,183,889 | 5/1965 | Peterson et al. | 119/45.3 |
| 3,976,032 | 8/1976 | Ramser et al. | 119/45.3 |
| 5,107,794 | 4/1992 | Bounds, Jr. | 119/45.3 |

Primary Examiner—Gene Mancene
Assistant Examiner—Thomas Price
Attorney, Agent, or Firm—William H. Eilberg

[57] ABSTRACT

An egg harvester has hingedly connecting nesting boxes resting on an elongate belt fixed at each end and along which a shuttle is pulled by a drive cable. The belt and a second conveyor define two slots which pass under the nesting boxes. The eggs and litter fall through slot and the eggs are removed from the litter by an egg separator and are transferred to an egg conveyor for transport to one end of the shed. Soiled litter and any manure is removed from the litter by a litter cleaner and fresh litter, supplied by a hopper on the shuttle is spaced across the belt which is brought back under the nesting boxes through the slot. The harvester enables collection of the eggs while hens remain in the nesting boxes as the shuttle passes underneath.

16 Claims, 9 Drawing Sheets

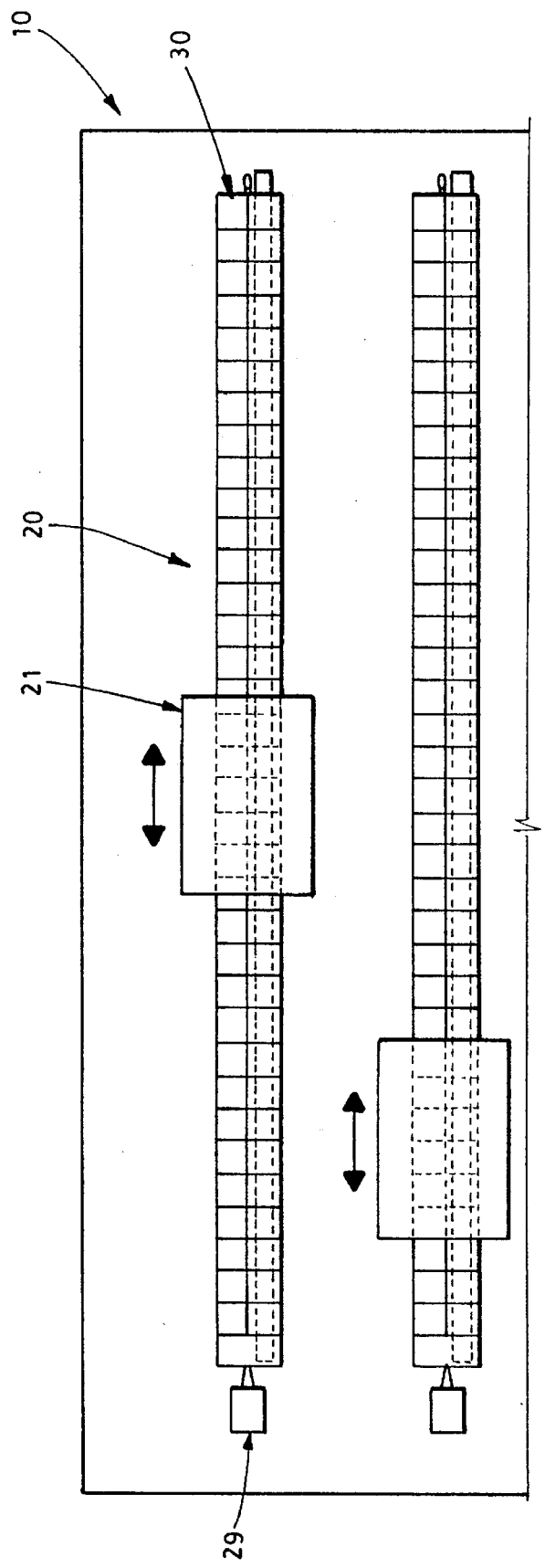
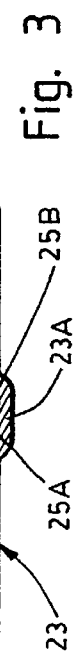
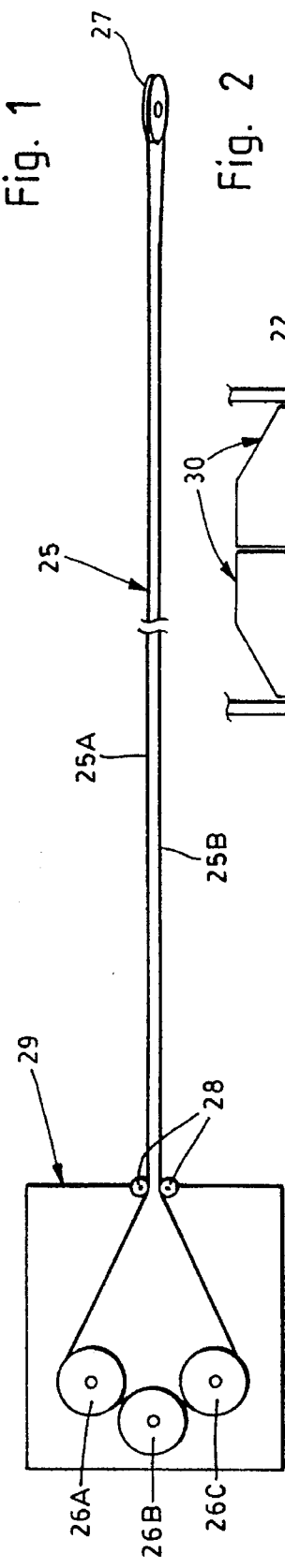
Fig. 1
Fig. 2
Fig. 3

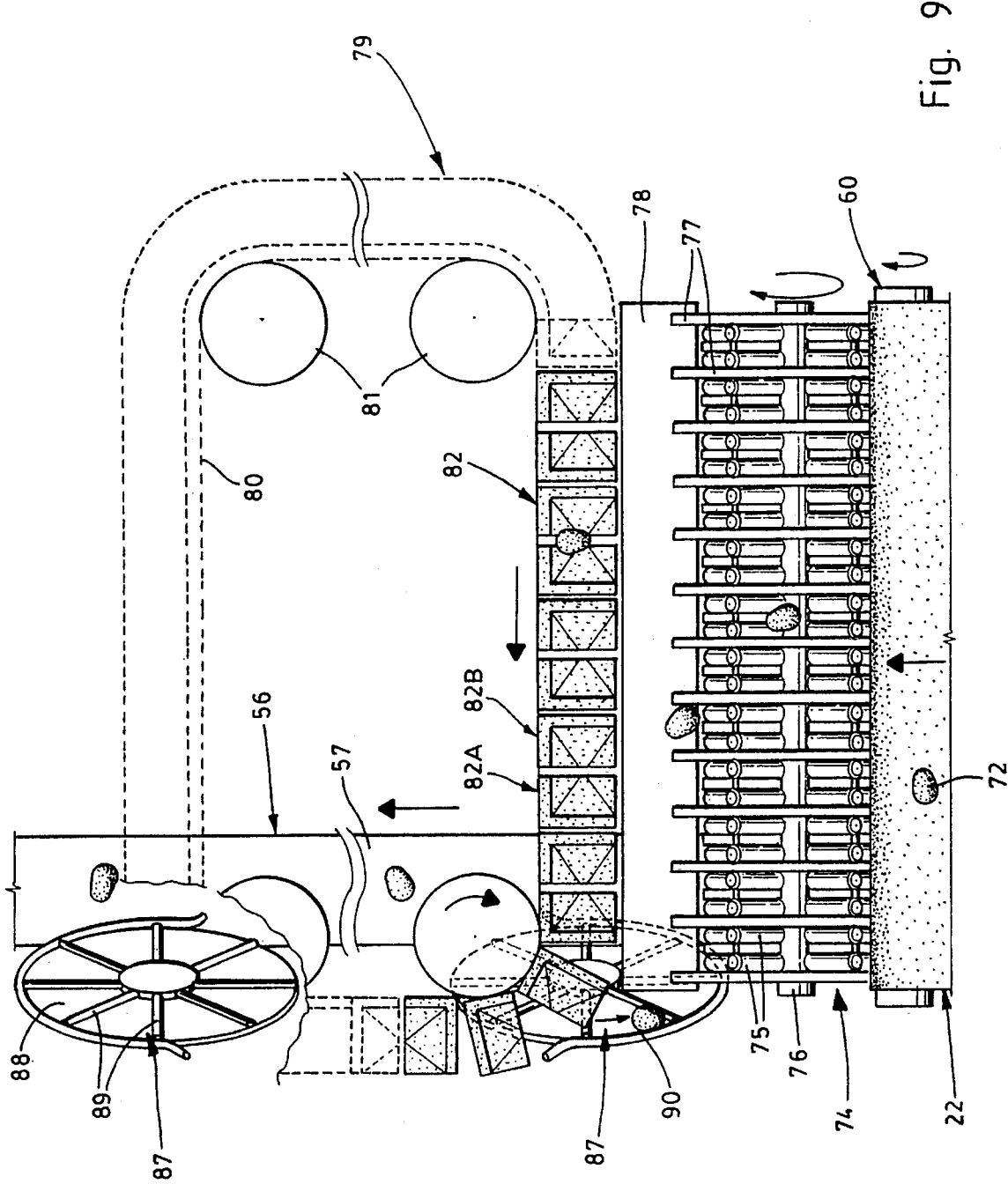

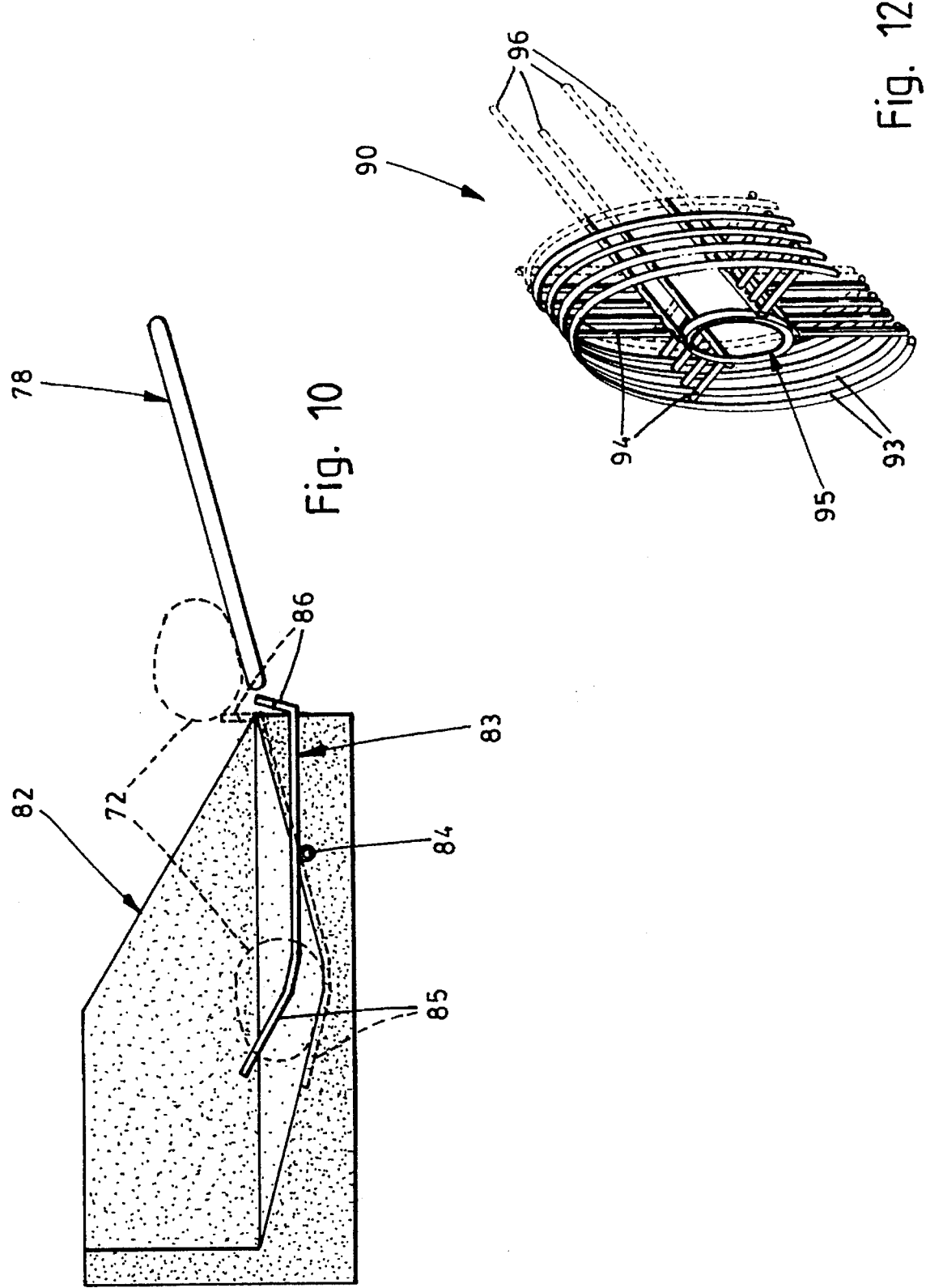

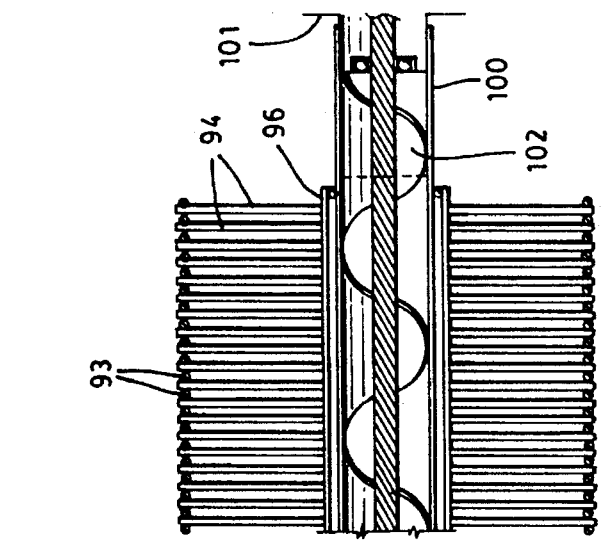
Fig. 13
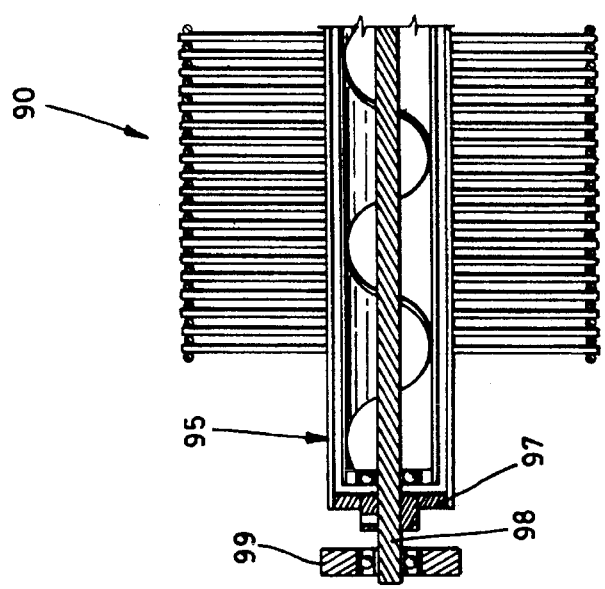
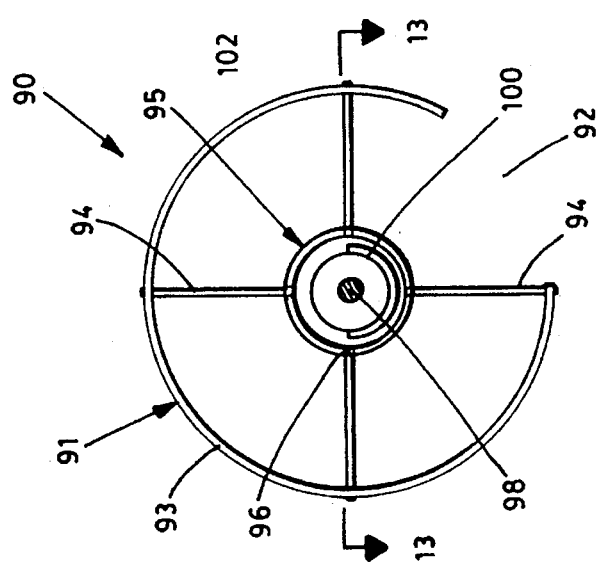
Fig. 11

EGG HARVESTER

BACKGROUND OF THE INVENTION

1. Field of the Invention

This invention relates to an egg harvester.

Egg production is still fairly labour intensive, especially on farms where the eggs are fertilized by allowing the hens to run-with the roosters in the laying sheds.

The eggs must be collected and stored shortly after laying and so must be collected, eg. 2–3 times daily.

Mechanical egg collection systems have been disclosed, inter alia, in AU-B-24004/84 (564393) (KIBBUTZ GIVAT CHAIM ICHUD) and WO 89/03637=AU-A-11547/88 (LANDMECO A/S) but these have not proved commercially acceptable in Australia.

In AU-B-24004/84, hen laying-stations are provided with a floor having a discharge opening at one end. A drawer bar is movable over the floor to push the eggs to the discharge opening through which the eggs fall gravitationally.

With this arrangement, it is not possible to provide litter (eg. wood shavings or sawdust) on the floor and the hens are disturbed on each pass of the drawer bar.

In WO 89/03637, the laying stations have a two-part nest bottom inclined towards each other and towards the centre of the nest to create a slit through which the eggs may roll onto a conveyor. With this arrangement, it is also not possible to provide litter in the nests.

Experience has shown that without the provision of litter, up to 40% of the hens may refuse to use the laying-stations but lay their eggs in the dirt and manure on the shed floor. The hot eggs are liable to bacterial contamination and shell staining and must be manually collected from the floor. They are also liable to be broken if stepped on by the workers as they move about the shed collecting the eggs.

It is an object of the present invention to provide an egg harvester where the eggs are collected with minimal disturbance to the hens.

It is a preferred object to provide an egg harvester which enables litter to be provided in the laying-stations.

It is a preferred object to provide a harvester where spoilt litter can be replaced with cleaned and/or fresh litter.

It is a still further preferred object to provide a harvester which reduces the labour content of the operation of a laying shed.

It is a still further preferred object to provide improved nesting boxes for the harvester.

Other preferred objects will become apparent from the following description.

In one aspect, the present invention relates to an egg harvester for collecting the eggs of laying hens or the like, including:

an enclosure defining a plurality of hen laying-stations along the length of the enclosure;

a flexible belt or band extending along the length of the enclosure forming a floor for the laying stations;

a shuttle or carriage movable along a path below the belt or band; and roller, drum, disc or bar means on the shuttle or carriage about which the belt or band passes to define at least one slot in the floor which advances under hens in the laying-stations as the shuttle or carriage is advanced, any litter and/or eggs on the belt or band falling through the or one slot for collection.

Preferably, an intermediate floor section, comprising a belt or band on driven rollers or discs, or a drum, is provided to define two slots in the floor with the belt or band, the eggs and litter falling through the first slot upstream of the intermediate floor section and the fresh litter being supplied to the floor at the second slot downstream of the intermediate conveyor.

Preferably, the rollers or discs are mounted or journalled on movable axles so that the orientation of the intermediate floor section, and the adjacent end sections of the floor, can be changed when the direction of travel of the shuttle or carriage is reversed.

Preferably, mechanical egg separator means separate the eggs from the litter falling through the first slot, conveyor means and transfer means transferring the eggs to an egg conveyor, preferably below the belt or band, the egg conveyor being selectively operable to convey the eggs to one end of the harvester.

Preferably, mechanical or vacuum separator means, separate soiled litter from the "clean" litter and the soiled litter may be transferred to the floor of the shed in which the harvester is provided. Preferably, hopper means, containing fresh litter, are mounted on the shuttle or carriage to move therewith, mechanical or pneumatic conveyor means transferring fresh litter to the belt or band to replace the lost soiled litter.

In an alternative embodiment where the litter is not used, the shuttle or carriage may be provided with a bath through which the belt passes, the bath containing cleaning and/or disinfecting liquid to clean the belt or band consisting of an artificial turf or similar surface in lieu of litter. Brush means, to scrub the belt or band, may be provided in the bath.

Preferably, the belt or band is supported on a mesh grid or parallel bars on a frame, which suspended from the roof frame of the shed. Preferably, the shuttle or carriage runs along the frame. A continuous cable or chain, or cable or chain attached to each end of the shuttle or carriage, may pass around drive rollers, a winch drum or the like to selectively drive the shuttle or carriage along the tracks or rails. Preferably, transmission means (eg. gears, chains, belts) interconnect the shuttle wheels to, eg. the driven rollers for the intermediate section, the egg separation means, conveyor means, transfer means, litter conveyor and the like to provide the drive for these components as the shuttle is advanced.

In one embodiment, the laying-stations incorporate nesting boxes mounted on legs, which may be hinged to allow the boxes to be lowered to assist in the training of hens to use the nesting boxes. Perch grids may be provided along each side of the enclosure so that the hens can enter the nesting boxes from opposite sides. The shuttle or carriage may run on tracks or rails mounted on the legs and the egg conveyor can also be mounted on the legs along one side of the enclosure. The hopper for the clean litter may be mounted above the nesting boxes, or side mounted.

Alternatively, the nesting boxes may rest on the belt or band and may be hingedly interconnected to enable the belt to be raised as the shuttle or carriage passes underneath. The lids for the nesting boxes may be mounted on frames supported on legs which rest on the belt or band, the legs being interconnected by side rails which assist in locating the nesting boxes on the belt or band and which provide perches for the hens. The hopper for the clean litter may be mounted on a frame on the shuttle or carriage and be supported to travel along one side of the nesting boxes to prevent the hens from entering, or leaving, the nesting boxes in the vicinity of the shuttle or carriage where the boxes are provided in back-to-back pairs, a plate on the shuttle or carriage may be provided to block the opposed boxes.

In a second aspect, the present invention resides in nesting boxes for hens, wherein:

each box has an end wall interconnecting a pair of side walls or a side wall or tab, arranged to be supported by a belt or band as the nesting box floor, each side wall or tab being hingedly connectable to the adjacent side wall of an adjacent similar nesting box.

The nesting boxes may be formed of cardboard, plastic sheet, fibreglass, sheet metal or the like and preferably one side wall is of reduced height to provide an entrance to the nesting box.

The hinge means between the boxes may include a tang received in a hole or slot; a pivot pin received in a hole or slot; or other suitable pivot means.

BRIEF DESCRIPTION OF THE DRAWINGS

To enable the invention to be fully understood, a number of preferred embodiments will now be described with reference to the accompanying drawings, in which:

FIG. 1 is a schematic plan view of a shed provided with two egg harvesters in accordance with the present invention;

FIG. 2 is a schematic plan view of the drive system for the shuttle;

FIG. 3 is a sectional end view of the drive, showing the nesting boxes on the belt;

FIG. 6A is an enlarged side view of the frame for a group of nesting boxes, as the shuttle is advanced, the lids being shown in the raised (ventilation) position in solid lines and the lowered position in dashed lines;

FIG. 7A is a similar view, with the shuttle travelling right to left;

FIG. 9 is a top plan view showing the transfer of the eggs from the belt to the egg conveyor;

FIG. 10 is a side view of the safety stop for the shuttle egg conveyor cups;

FIG. 11 is an end elevational view of the litter cleaner;

FIG. 12 is a perspective view of one end of the litter cleaner;

FIG. 13 is a part sectional front view of the litter cleaner;

DETAILED DESCRIPTION OF THE PREFERRED EMBODIMENTS

Figure 4:
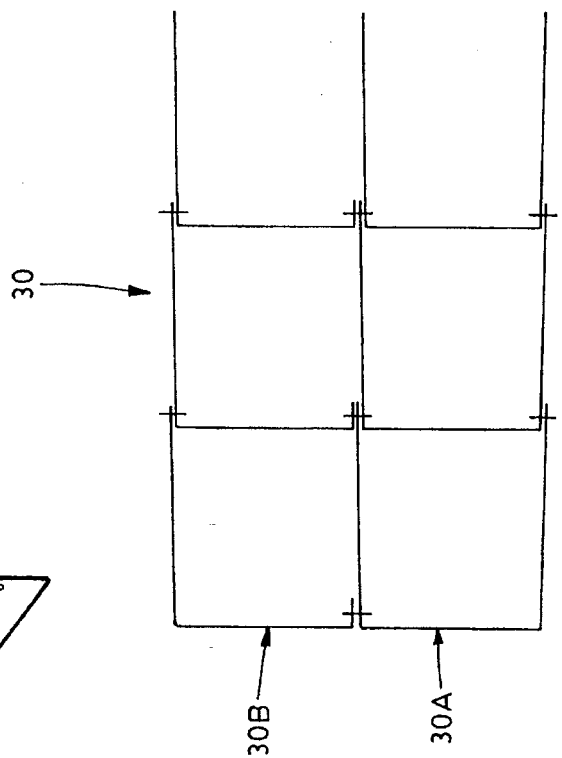
FIG. 4 is a plan view of a group of nesting boxes.

Referring to FIG. 1, the shed 10 has two egg harvesters 20, in accordance with the present invention, provided in parallel. Each harvester has nesting boxes 30, to be hereinafter described, arranged in groups of back-to-back pairs, there being preferably ten boxes in each group, each group being bounded by a respective frame to be hereinafter described.

Each harvester 20 has a shuttle 21 arranged to travel from one end of the harvester to the other to harvest the eggs laid in the nesting boxes 30.

Referring to FIG. 3, the nesting boxes 30 are supported on a belt 22, anchored at each end, supported on a mesh grid 23 between tracks 24 along which the shuttle 21 travels. The tracks 24 and mesh grid 23 form a part of a frame suspended from the roof trusses for the shed 10 or on free standing legs. To drive the shuttles 21 along the tracks 24, a continuous cable 25 (see FIG. 2) is anchored to the shuttle 21, and its runs 25A, 25B are supported in a central trough 23A in the mesh grid 23 (below the belt 22). The cable passes around three drive pulleys 26A, 26B, 26C and an idler pulley 27 (and guide rollers 28). The drive rollers 26A–C are driven by a variable speed electric motor (in housing 29) to selectively advance the shuttle 21, in either direction, at a speed of, eg. 80–100 meters per hour.

Figure 5:
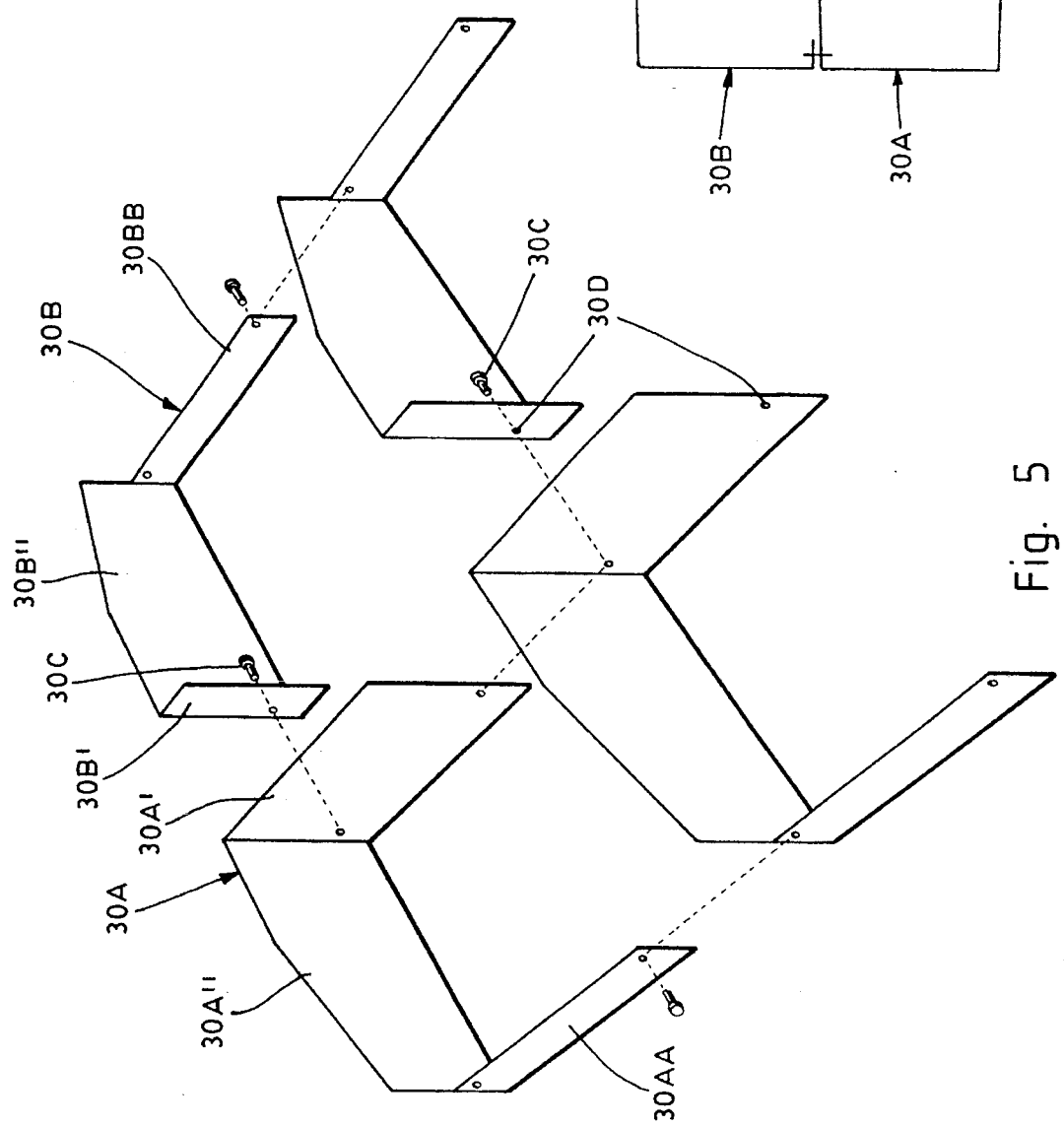
FIG. 5 is an exploded perspective view of the nesting boxes.

Referring to FIGS. 4 and 5, the nesting boxes 30 may be formed from cardboard, sheet plastics, fibreglass, sheet metal or the like, with an outer side wall of reduced height for ease of entry or exit from, the nesting boxes, by the hens. As shown in FIGS. 4 and 5, the boxes are provided in back-to-back pairs 30A, 30B, hinged together.

The nesting boxes 30A have an inner side wall 30A and end wall $30A^{11}$ of full height and an outer side wall 30AA of reduced height. The nesting boxes 30B have a similar end wall $30B^{11}$ and outer side wall 30BB, but the inner side wall is replaced by a tab $30B^1$.

The free (distal) ends of each side wall $30A^1$, 30AA, 30BB are provided with plastic pivot pins 30C engageable in grommets 30D in the side walls $30A^1$, 30AA, 30BB, $30B^1$ also receiving the pivot pins 30C), the end walls $30A^{11}$, $30B^{11}$ forming the dividing walls between nesting boxes 30A, 30B end-to-end. The nesting boxes are thereby linked together (in groups of ten) in a flexible arrangement to accommodate the travel of the shuttle 21 therebeneath. The last pair of boxes in each group require a small blank end wall.

For quarantine purposes, the nesting boxes 30 may be formed of cardboard, which may be burnt after each laying cycle; or of plastics, fibreglass or sheet metal, which may be disinfected and re-used.

Figure 6:
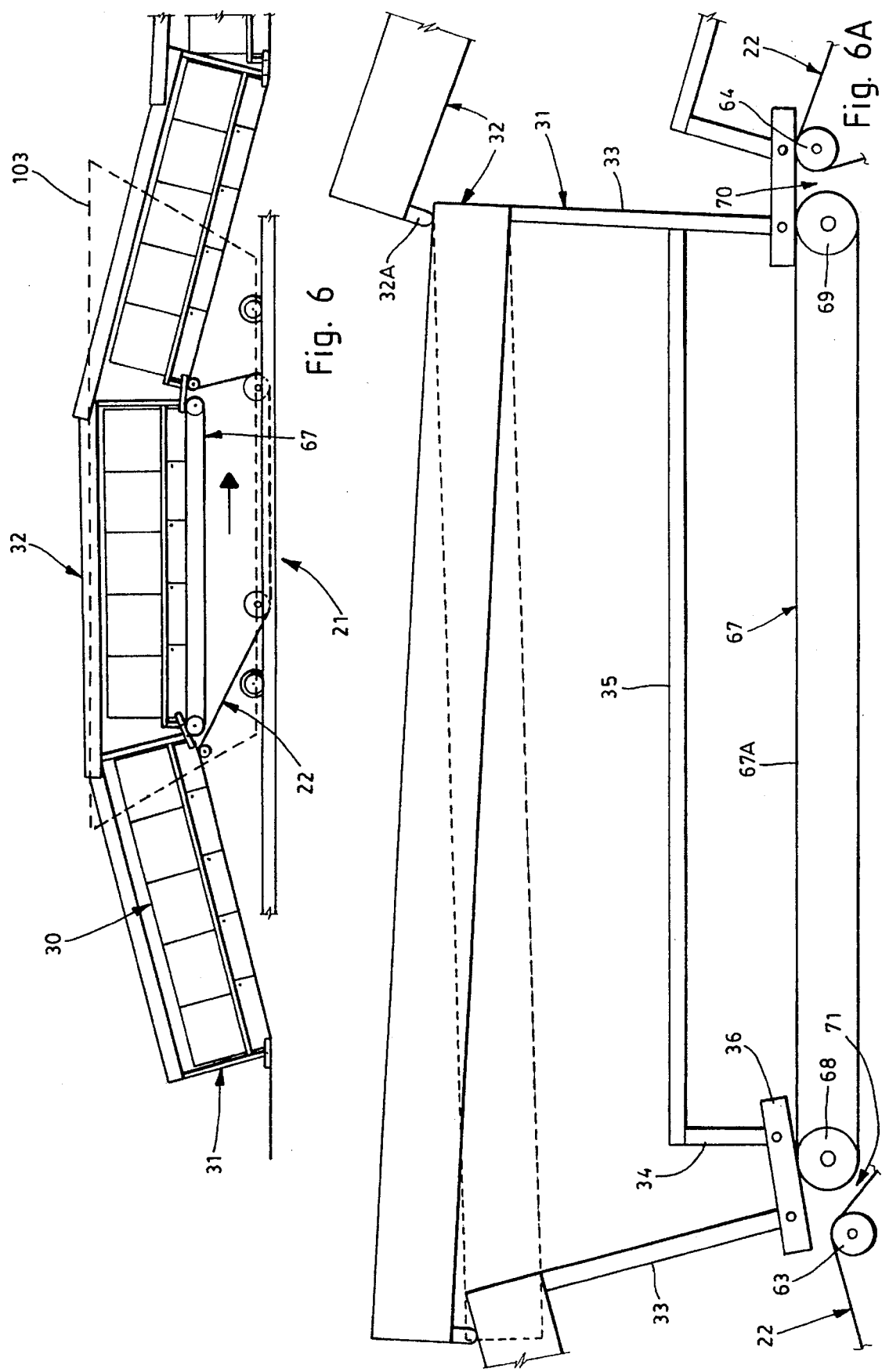
FIG. 6 is a schematic side view of the nesting boxes (and their lids) as the shuttle advances.

Referring now to FIGS. 6 and 6A, the nesting boxes 30 are shown in their groups, restrained by their frames 31 and overlaid by gable roof sections 32. Each frame 31 has a pair of rear legs 33 and a pair of short front legs 34 interconnected by side (and end) perch rails 35. The rear end of each roof section 32 is supported by the rear legs 33, while the front end is supported by, and overlaps, the rear end of the preceding roof section 32. (adjustable legs 32A) allow the front ends of the roof sections 32 to be raised for increased ventilation of the nesting boxes 30 (see solid lines), eg. in summer, or lowered for reduced ventilation (see dashed lines), eg. in winter.

A roof 36 hingedly interconnects a rear leg 33 of one frame 31 to the adjacent front leg 34 (see FIG. 6A) and spans the gaps in the belt 22 as the shuttle 21 is advanced.

Figure 7:
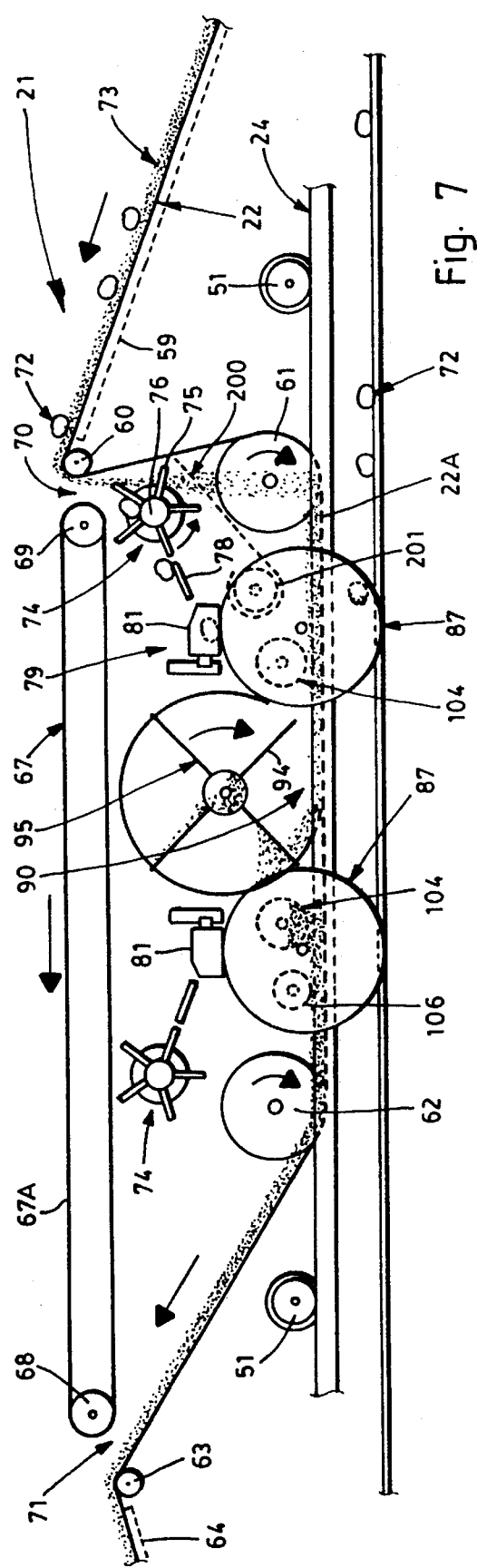
FIG. 7 is a schematic side view of the shuttle shown travelling left to right.
Figure 8:
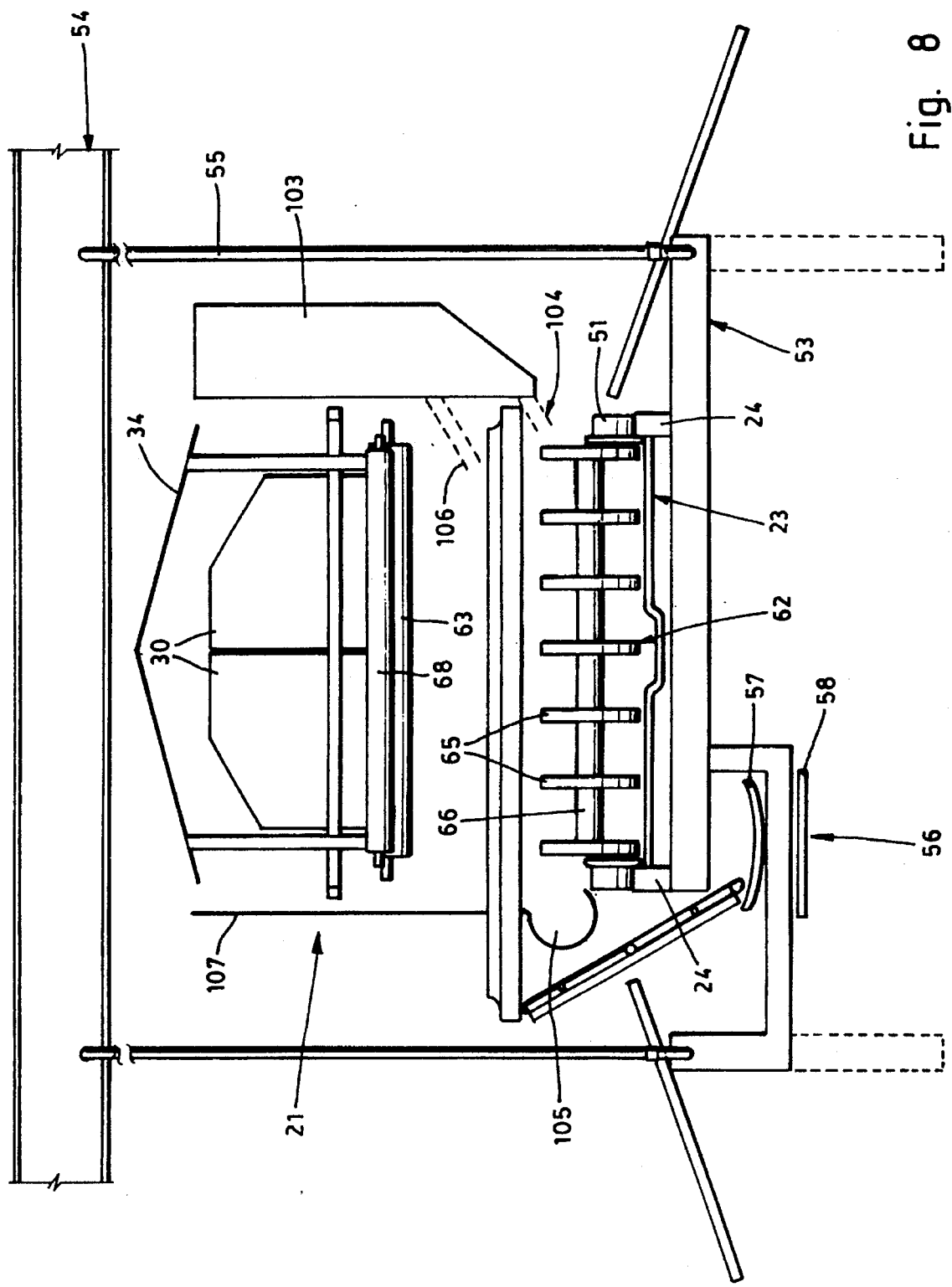
FIG. 8 is a schematic end view of the shuttle, the belt being omitted, for clarity.

Referring now to FIGS. 7, 7A and 8, the shuttle 21 has a frame 50 supported on wheels 51 which run on the tracks 24 on a main frame 53 suspended from the roof trusses 54 by support cables 55 (or beams). An egg conveyor 56 has a troughed upper run 57 and return run 58 and is supported on the main frame 53 below, and to one side, of the path of the shuttle 21. The egg conveyor 56 is arranged to selectively transport the eggs to one end of the shed 10 during, or after, one or more runs of the shuttle 21 along the nesting boxes 30.

The belt 22 (under the nesting boxes) travels up a ramp 59 and passes around a top roller 60. It then passes around a front bottom support roller 61 and has a horizontal run 22A until it passes around a rear bottom support roller 62 before being upwardly inclined to pass around a top support roller 63, before travelling down a ramp 64. As shown in FIG. 8, both bottom support rollers 61, 62 comprise spaced discs 65 on an axle 66 journalled on the shuttle frame 50.

FIG. 7 shows the configuration of the shuttle 21 when travelling left to right, while FIG. 7A shows the changed configuration when travelling right to left (ie. on a return run).

A second belt 67 passes around movable rollers 68, 69 on the shuttle frame 50 and its upper run 67A provides a combination of the floor of the nesting boxes 30 between slots 70, 71. The slots 70, 71 are dimensioned to allow the eggs 72 and litter 73 to fall gravitationally therethrough without disturbing the hens in the nesting boxes 30 as the shuttle 21 passes beneath them.

The eggs 72 and litter 73 fall through slot 70 and the eggs are separated from the litter by an egg separator 74 which has a plurality of flexible radial fingers 75 on a shaft 76 journalled transversely to the shuttle frame. Fixed fingers 77 (see FIG. 9), provided intermediate every second pair of radial fingers 75, guide the eggs 72 onto an inclined tray 78, which transfers the eggs to the shuttle egg conveyor 79.

The shuttle egg conveyor 79 has bands or chains 80 passing around four corner pulleys or sprockets 81. Mounted on the bands 80 are cups 82, split into two halves 82A, 82B so that as the cups pass around a pulley 81, they are opened to enable the discharge of the egg therein.

To ensure only one egg enters each cup, the egg triggers a T-bar B3 (see FIG. 10) hingedly mounted on one of the half cups 82A, 82B via a hinge pin 84. The egg depresses the tail 85 of the T-bar 83 to cause a barrier bar 86 to be raised to prevent the entry of a further egg. At a discharge point, where the cups pass around a pulley 81, the cups are opened and the eggs are released and dropped onto a segmented rotary disc 87 which rotates about an inclined axis. Each egg enters a segment 88, provided with radial side walls 89, and the egg is transferred to a discharge point above the top run 57 of the egg conveyor 56, the eggs being held in their segments 88 between the entry and discharge points by a curved rail 90.

The litter 73 remains on the mat and any soiled litter (and manure) is removed by the litter cleaner 90 (see FIGS. 11 to 13). The cleaner 90 has an outer screen 91, of substantially C-shape in end view, which is selectively rotatable to provide a mouth 92 directed against the flow of the litter 73 (see FIGS. 7 and 7A). The screen 91 is formed of spaced bars 93, which receive between adjacent pairs, the fingers 94 of a rotary screen 95. The rotary screen 95 has parallel bars 96, from which the fingers 94 radiate, mounted at one end on a disc 97 fixed to a drive shaft 98 journalled in bearings 99 on the shuttle frame. The other end is journalled about an open-topped auger tube 100 which is fixed to the housing 101 of a gearbox which drives the shaft 98. An auger flyte 102 on the shaft 98 rotates within the auger tube 100. As the rotary screen 95 rotates, any soiled litter/manure is picked up by the fingers 94 of the rotary screen 95 and deposited through the top of the auger tube 100 for discharge to one side of the shuttle 21 by the auger flyte 102.

To replenish the lost litter, clean litter is transferred from a hopper 103 (mounted at one end of the shuttle 21) via a litter distribution auger 104 (which has an open bottom) which extends transversely to the run 22A (see FIG. 7) of the belt 22 downstream of the litter cleaner 90. Litter 73 is spread over the belt to the desired depth, eg. 50–75 mm and any excess is received in a sump 105 (see FIG. 8) at the opposite side of the shuttle 21 to the hopper 103 and is recycled thereto by a flexible auger 106.

It will be noted in FIG. 8 that the hopper 103 is arranged to close off the entry to the nesting boxes 30 whilst the nesting boxes are being traversed by the shuttle 21 to prevent the hens from entering, or leaving, the nesting boxes. A plate 107, on the opposite side of the shuttle 21, moves in parallel with the hopper 105 to close the nesting boxes on the opposite side thereto. The clean litter moves up the inclined run of the belt 22 and over the top pulley 63 so that the nesting boxes are again lined with litter. As hereinbefore described, the bottom rollers 61, 62 have discs 66 on thin shafts 65 to allow the passage of the litter therepast, the discs cutting a path through the litter.

The operation of the harvester 20 will now be described.

The shuttle 21 starts at one end of the shed and is advanced by the cable 25 towards the other end, passing under the nesting boxes 30. As was shown, eg. in FIGS. 6 and 6A, the nesting boxes 30 and the belt 22 are raised and then lowered as the shuttle 21 passes underneath, the slots 70, 71 travelling transverse to the nesting boxes.

When travelling left to right (see FIG. 7), the eggs 72 and the litter 73 fall through slot 70 without disturbing the hens (retained in the nesting boxes by hopper 105 and plate 107). The eggs 72 are separated from the litter 73 by the rotary egg separator 74 and transferred to the cups 81 of the shuttle egg conveyor 79. The eggs are transported to, and deposited onto, the rotary disc 87 and then deposited onto the top run 57 of the egg conveyor 56.

When the shuttle 21 has completed its run (or more than one run) along the nesting boxes, the operator can operate the egg conveyor to convey the eggs 72 to one end of the shed 10 for collection and storage (or packing). The nesting boxes 30 are supported by the top run 67A of the second conveyor 67 until slot 71 passes underneath and they are then supported by the belt 22 downstream of the slot.

Spoilt litter or manure is removed by the litter cleaner 90 and fresh litter is deposited by the litter distribution auger 104 downstream of the litter cleaner 90. The clean litter 73 is transported up the inclined run of the belt 22 and placed under the nesting boxes as slot 71 is advanced. When the direction of travel of the shuttle 21 is reversed, the configuration of the shuttle 21 is reversed (see FIG. 7A) and the shuttle travels back along under the nesting boxes 30 (and belt 22).

It is a preferred that the belt 22 and belt 67 have a textured top surface (eg. circular, square or diamond shaped protrusions; dimples or recesses) to assist in retaining the eggs and litter thereon.

In certain countries, litter 73 is not used. In these countries, a modified harvester 20 may be employed when the belt 122 and the second conveyor belt 167, have a top surface similar to artificial grass.

To clean the manure from the belt 122, after the eggs have been collected, it is passed through a bath 200, containing cleaning and disinfecting fluid 201 and a rotary cleaning brush 202. The litter hopper 105 and augers 104, 106 are omitted, with plates 107 being provided to pass along both sides of the nesting boxes.

To enable all of the litter 73 to be replaced, ie. at the end of a laying cycle, a plate 200 is mounted below the front top roller 60 and the litter 73 is conveyed to a transverse auger 201 which conveys the litter 73 to one side of the harvester 20 for collection and removal.

In a modified form, the auger 201 may be replaced by a distributor for formaldehyde prills or liquid sanitizer for the litter to kill harmful bacteria in the litter 73.

It will be readily apparent to the skilled addressee that the harvester provide an efficient means to collect the eggs, with minimum labour and with minimum disturbance to the hens. The shuttles 21 may be programmed to make 2 or 3 runs early in the morning and then further runs at specified intervals through the day so that the eggs are not left uncollected for too long.

Figure 14:
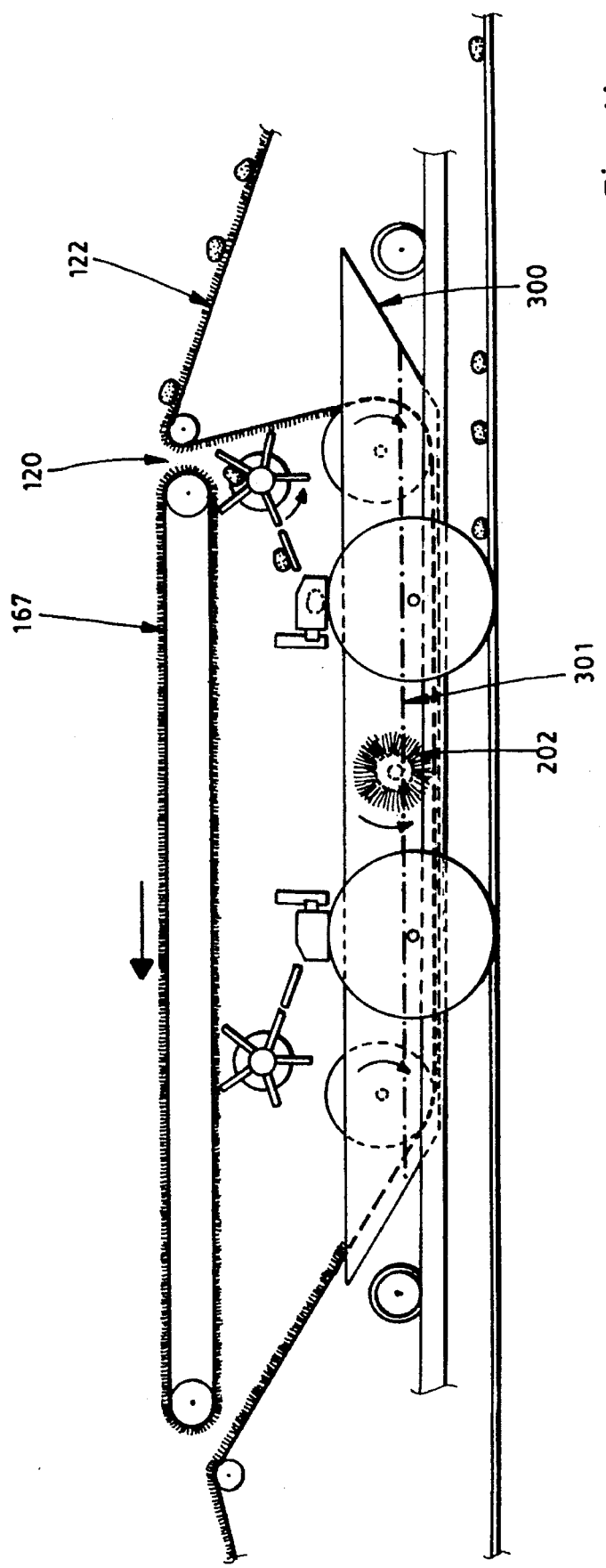
FIG. 14 is a schematic side view of a shuttle for a "litter-less" harvester.

While a double slot arrangement has been shown, a single slot to collect the eggs and litter can be used. This arrangement may be preferred in laying sheds where litter is not used and the belt provided with an artificial turf or lawn surface which may be cleaned by a washer/scrubber or scraper (see FIG. 14).

With the harvester shown, the eggs are collected, and the dirty litter removed and replaced without disturbance to the laying hens.

Various changes and modifications may be made to the embodiments described and illustrated without departing from the scope of the present invention defined in the appended claims.

I claim:

1. An egg harvester for collecting the eggs of laying hens or the like, including:

an enclosure defining a plurality of hen laying-stations along the length of the enclosure;

a flexible belt or band extending along the length of the enclosure forming a floor for the laying stations;

a shuttle or carriage movable along a path below the belt or band; and roller, drum, disc or bar means on the shuttle or carriage about which the belt or band passes to define at least one slot in the floor which advances under hens in the laying-stations as the shuttle or carriage is advanced, any litter and/or eggs on the belt or band falling through the or one slot for collection.

2. A harvester according to claim 1 and further including:

an intermediate floor section, comprising a second belt or band on driven rollers or discs, or a drum, provided to define two slots in the floor with the belt or band, the eggs and litter falling through the first slot upstream of the intermediate floor section and fresh litter being applied to the floor at the second slot downstream of the intermediate floor section.

3. A harvester according to claim 2 wherein:

the rollers or discs for both the belt or band and the secondary belt or band are mounted or journalled on movable axles so that the orientation of the intermediate floor section, and the adjacent end sections of the floor, can be changed when the direction of travel of the shuttle or carriage is reversed.

4. A harvester according to claim 1 wherein:

the belt or band is supported on a grid or sub-frame on a main frame supported on legs or suspended from the roof trusses of a laying shed and is anchored at each end of the enclosure; and the shuttle or carriage has ramp means at each end to raise the belt or band as the shuttle or carriage travels below the belt or band to cause the slot or slots to move along the belt or band.

5. A harvester according to claim 4 wherein:

the shuttle or carriage travels along a track or rails along each side of the belt and is driven by a continuous cable or chain driven by a reversible motor.

6. A harvester according to claim 1 wherein:

mechanical egg separator means are provided on the shuttle or carriage to receive eggs falling through the slot or slots; and shuttle egg conveyor means transfer the eggs from the egg separator means to an egg conveyor extending below, and along the length of the enclosure, to enable the eggs to be selectively conveyed to one end of the enclosure for collection.

7. A harvester according to claim 6 wherein:

the mechanical egg separator means includes a plurality of radial flexible fingers on a rotatable shaft interleaved between spaced, fixed fingers;

the shuttle conveyor means includes a plurality of egg cups movable in a path transverse to the direction of travel of the shuttle to convey the eggs to one side of the shuttle; and an inclined, segmented rotary disc transfers the eggs from the shuttle egg conveyor to the egg conveyor.

8. A harvester according to claim 7 wherein:

each egg cup comprises two halves mounted on a flexible chain or band, the halves being swung apart as the cup passes around a corner pulley or sprocket to enable the eggs to be deposited onto the segmental disc; and retractable gate means only allow one egg to enter each cup at any one time.

9. A harvester according to claim 1 wherein:

mechanical or vacuum litter separation means separate soiled litter from the clean litter and discharge the soiled litter to one side of the machine; and hopper means on the shuttle provide a supply of clean litter which is distributed to the belt or band by open-bottomed auger means.

10. A harvester according to claim 9 wherein:

the mechanical litter separator means includes a fixed screen means with rotary fingers interleaved between the fixed bars to elevate the soiled litter to a position to be discharged into an open-topped auger which deposits the soiled litter to one side of the shuttle, the clean litter passing through the fixed screen.

11. A harvester according to claim 10 wherein:

the fixed screen has a reversible mouth directed towards the litter in a direction parallel to the direction of travel of the shuttle.

12. A harvester according to claim 1 wherein:

the litter hopper means and a plate, or a pair of plates, are mounted on the shuttle and move therewith to prevent hens entering, or leaving, the laying stations as the shuttle travels underneath the laying stations.

13. A harvester according to claim 1 wherein:

in a litter-free harvester, the belt or band passes through a liquid bath on the shuttle, the bath containing cleaning and/or disinfecting liquid and a rotary brush means to scrub any soiled matter from the surface of the belt or band.

14. A harvester according to claim 1 wherein:

the laying stations comprise nesting boxes arranged in pairs, side-by-side, resting on the belt or band and hingedly interconnected together to be raised and lowered as the shuttle passes underneath the nesting boxes.

15. A harvester according to claim 13 wherein:

lids for the nesting boxes are mounted on frames supported on legs hingedly connected to feet nesting on the belt or band, the feet spanning the slot or slots as they move past the feet, and the legs are interconnected by side rails, which provide perches for the hens, and end rails to separate the nesting boxes into groups.

16. A method of harvesting eggs from a plurality of laying stations arranged in at least one row supported on flexible belts or bands as the floor for the laying stations includes the steps of:

moving at least one slot along the band or belt below the laying stations to allow eggs in the laying station to fall through the slot or slots; and conveying the eggs from a position below the slot to an egg conveyor operable to selectively move the eggs to one end of the row of laying stations.

\* \* \* \* \*